Dec. 12, 1944.  F. W. HAYWOOD  2,364,789
ESTIMATION OF A CONSTITUENT IN A FLUID
Filed June 18, 1941  2 Sheets-Sheet 1
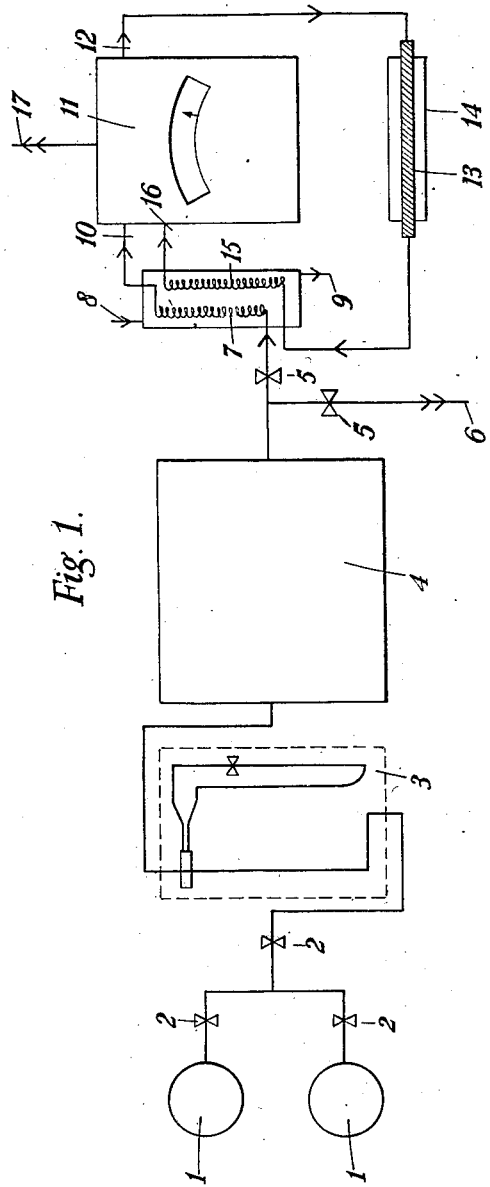
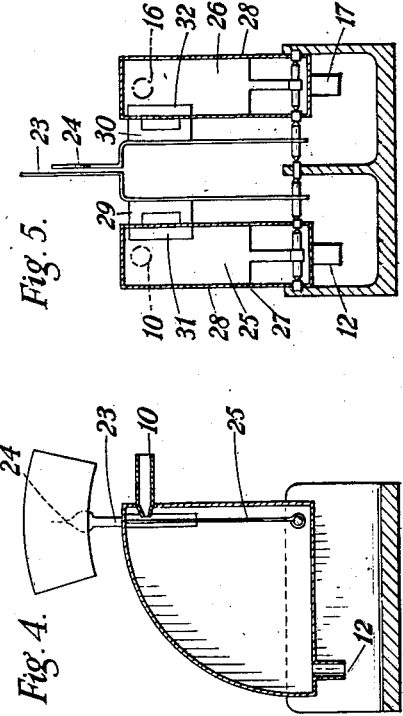
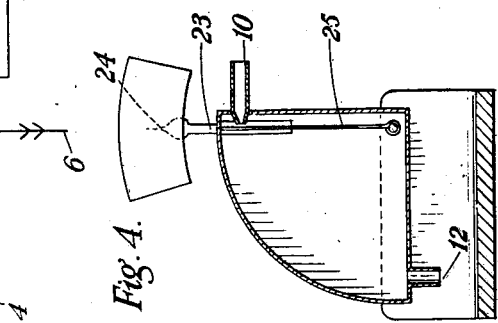
Frederick W. Haywood Inventor
by
Attorney Dec. 12, 1944.   F. W. HAYWOOD   2,364,789
ESTIMATION OF A CONSTITUENT IN A FLUID
Filed June 18, 1941   2 Sheets-Sheet 2
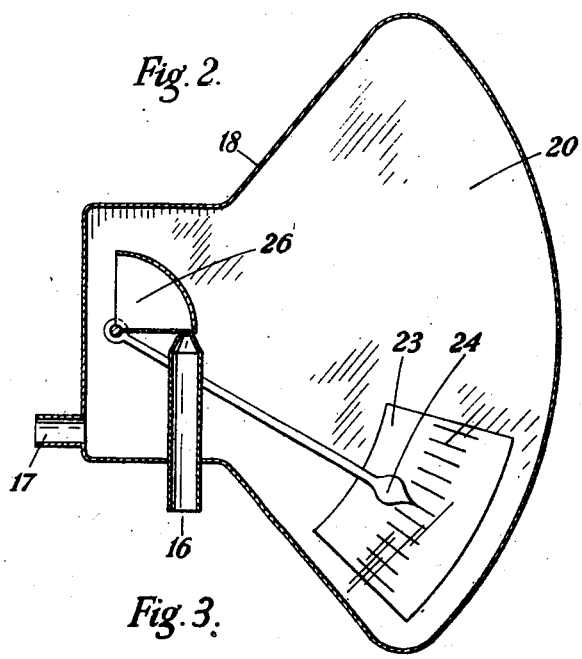
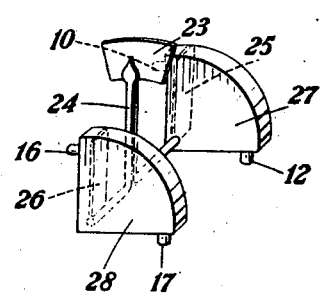
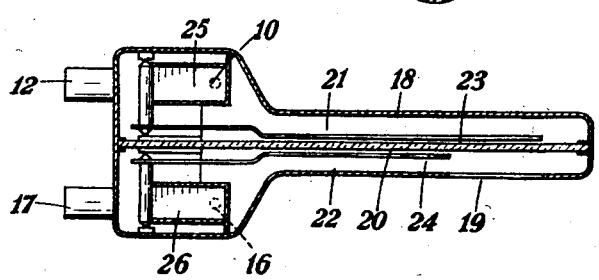
Inventor
Frederick W. Haywood
by
Attorney Patented Dec. 12, 1944

2,364,789

UNITED STATES PATENT OFFICE 2,364,789

ESTIMATION OF A CONSTITUENT IN A FLUID

Frederick Wardle Haywood, Watford, England, assignor of one-half to Wild-Barfield Electric Furnaces Limited, Watford, England Application June 18, 1941, Serial No. 398,673
In Great Britain May 9, 1940

2 Claims. (Cl. 23—232)

This invention relates to the estimation of a constituent in a fluid and is especially though not essentially applicable to the estimation of the quantity of ammonia in a mixture of gases such as those leaving a nitriding furnace.

For convenience, the invention will be described with reference to its specific application to the estimation of ammonia in the gases leaving a nitriding furnace but it will be understood that the invention is applicable to the estimation of other constituents of a mixture of which the volume alters in specific proportions consequent upon the dissociation or the association of one or more of the constituents.

The methods at present used for the estimation of ammonia in nitriding gases usually require skilled or semi-skilled control and it is even then difficult, if not impossible to ensure a high degree of accuracy.

An object of the present invention is to provide a method of estimation of the constituents of the mixed gas which does not require skilled control and also to provide apparatus for this purpose which automatically denotes the ratio of the constituent estimated.

A further object is to provide apparatus wherein the gas (or a sample thereof) is treated to cause dissociation of a constituent the resulting change in volume is measured and from this change, the proportion of a constituent is estimated by apparatus giving a direct reading of this proportion.

In the particular application to the estimation of ammonia for example, in the mixed gases leaving a nitriding furnace, a known volume of the mixture of gases is passed through a cracking unit in which the free ammonia not dissociated in the nitriding furnace is completely dissociated into nitrogen and hydrogen with a consequent doubling in volume, unit volumes of ammonia giving two volumes of a mixture of hydrogen and nitrogen. The volume of the mixture after passing through the cracking unit is measured, the increase being proportional to the amount of ammonia in the original volume of mixture, and the proportion of ammonia is thus known.

The volume of the mixture, before and after cracking, may be measured by volume-meters of any suitable type, preferably such as are independent of the density of the gases measured. In some cases a single volume meter may be used to measure the two volumes.

Those parts of the invention for which a monopoly is desired are set out in the claims.

One specific example is illustrated by the accompanying drawings wherein:

Fig. 1 is a diagram showing the arrangement,
Fig. 2 is a front sectional view of an instrument, and
Fig. 3 a sectional plan of the same,
Fig. 4 is a front sectional view of combined measuring instruments,
Fig. 5 a side sectional view, and
Fig. 6 a perspective view of a part of the same.

In this example, the ammonia is supplied from cylinders 1 with suitable reducing and control valves 2 through a control panel 3 of known form to the nitriding furnace indicated at 4. Control valves 5 enable the gas leaving the furnace and consisting of a mixture of nitrogen, hydrogen and uncracked or undissociated ammonia to be passed to atmosphere as indicated at 6 or a sample or proportion to be passed at will through the coil 7 of a cooler of the non-contact type through which cooling water is passed as indicated at 8 and 9. The gas passes at 10 into one volumetric meter device of the instrument 11 which will be referred to later and leaves the instrument at 12. The gas then passes over the appropriate catalyst mass 13 in a thermostatically controlled furnace indicated at 14, wherein the uncracked ammonia is completely cracked to a mixture consisting of 75% hydrogen and 25% nitrogen. The mixture is then passed through the coil 15 of the cooler to ensure that it enters the second volumetric meter device at 16 at the same or substantially the same temperature as that at which the original mixture entered the first. From the second meter device the gas discharges to atmosphere at 17.

Turning now to the instrument shown at Figs. 2 and 3, this comprises a gas-tight case 18 with a window at 19 and a transparent gas-tight partition at 20. The two compartments 21 and 22 thus formed are used for housing pressure chambers controlling the position of the scale 23 and the pointer 24 respectively. Jets issuing from the connections 10 and 16 respectively impinge upon the vanes 25 and 26 pivoted in segmental cover plates and so give the respective deflections of scale and pointer against a spring control (not shown) or gravity, the differential reading being given directly by the reading of the pointer against the scale.

In the form of Figs. 4, 5, and 6, vanes 25 and 26 are pivoted in individual gas-tight pressure chambers 27 and 28 of non-magnetic material. The movement in this case is imparted to the external scale and pointer 23, 24 by means of small permanent magnets 29, 30 attached to them and keepers 31, 32 attached to the vanes. In operation, the control valves 5 are set to pass a suitable proportion of the mixed gas to the cooling coil 7, and thence to that meter device of the instrument 11, which deflects the scale. The gas then passes over the catalyst 13 in the cracking furnace wherein the uncracked ammonia is completely cracked, with consequent doubling of its volume. The gas is then again cooled in coil 15 and passed through the second meter device of instrument 11 which deflects the pointer. The differential reading then denotes the quantity of ammonia in the original volume.

It will be understood that such modifications may be made in the specific method and apparatus mentioned as come within the broad idea of the invention. It will be understood that the meters described are intended to serve as instruments for measurement of volume increase in the gas after decomposition of ammonia as compared with the volume measurement of the gas before such decomposition, with a view to determining by such measurement a comparatively close estimation of the quantity of ammonia in a gaseous stream, for example, such as leaves a nitriding furnace.

I claim:

1. A method of estimating the quantity of free ammonia contained in mixed gas leaving a nitriding furnace, consisting in subjecting the mixed gas to a predetermined temperature condition, then metering the volume of the mixed gas, subjecting the mixed gas after metering to a cracking to break down the ammonia content as a free gas to thereby increase the volume of the mixed gas to an extent incident to the free ammonia, subjecting the mixed gas of increased volume to a temperature condition identical with that condition of the mixed gas before metering, and metering the volume of the gas of increased volume, the metering of the volume of mixed gas and the metering of the volume of the gas of increased volume being correlated for a single differential reading to indicate measurement of volume increase of one gas over the other and thereby the proportion of the free ammonia constituent of the original mixed gas.

2. A method of estimating the relative volume of free ammonia contained in the mixed gas leaving a nitriding furnace, consisting in subjecting the mixed gas as leaving the furnace to a predetermined temperature condition, then measuring the volume of such gas, submitting such gas after volumetric measurement to a decomposing influence for decomposing the free ammonia into hydrogen and nitrogen without separation from the volume of the original gas to thereby cause such free nitrogen and hydroegn to increase the volume of the original gas to a degree dependent on their volumes, subjecting the gas of increased volume to a similar temperature as was the original gas, finally subjecting the gas of increased volume to volumetric measurement, and then comparing the volumetric measurements of the gases before and after the decomposition of the ammonia to determine by the difference of such measurements the relative volume of free ammonia in the original gas leaving the furnace.

FREDERICK WARDLE HAYWOOD.